United States Patent [19]
Ollinger et al.

[11] Patent Number: 4,554,718
[45] Date of Patent: Nov. 26, 1985

[54] METHOD OF REINFORCING A CEILING RUNNER

[75] Inventors: James C. Ollinger; Melvin H. Shaub, both of Lancaster, Pa.

[73] Assignee: Armstrong World Industries, Inc., Lancaster, Pa.

[21] Appl. No.: 616,499

[22] Filed: Jun. 4, 1984

[51] Int. Cl.[4] ............................................. B23P 17/00
[52] U.S. Cl. .................................... 29/155 R; 29/429; 29/458; 29/469.5; 29/514; 29/515; 52/484; 52/729; 52/732; 156/202
[58] Field of Search .............. 29/469.5, 429, 155 R, 29/509, 458, 514, 515; 52/484, 729, 732; 156/264, 306.6, 184, 201, 202

[56] References Cited
U.S. PATENT DOCUMENTS

| | | | |
|---|---|---|---|
| 1,253,216 | 1/1918 | Day | 52/732 X |
| 2,922,204 | 1/1960 | Mason | 156/201 X |
| 2,958,909 | 11/1960 | Bradley et al. | 156/201 |
| 3,029,914 | 4/1962 | Macomber | 52/729 X |
| 3,150,440 | 9/1964 | Jahn | 29/155 R |
| 3,355,206 | 11/1967 | Valsnik | 52/484 X |
| 3,650,144 | 3/1972 | James | 29/469.5 X |
| 3,845,544 | 11/1974 | Nurminen | 29/458 |
| 4,087,300 | 5/1978 | Adler | 156/184 |
| 4,151,031 | 4/1979 | Goad et al. | 156/201 |
| 4,206,578 | 6/1980 | Mieyal | 52/484 X |

Primary Examiner—Charlie T. Moon

[57] ABSTRACT

A method is provided for adding strength to a T-bar grid fabricated with a double web and capped system. The addition of strength is achieved by coating the inside portions of the T-bar with a hot melt adhesive. Cooling sets the adhesive and results in the parts of the grid member becoming a unitized structure.

2 Claims, 3 Drawing Figures

Fig. 1
Fig. 2
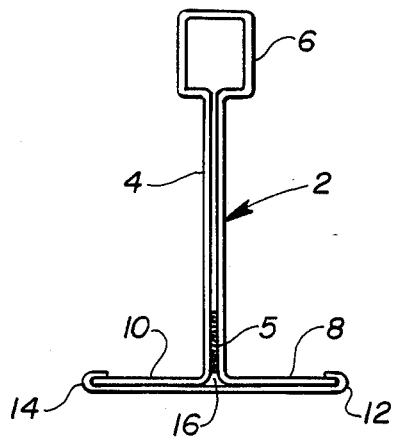
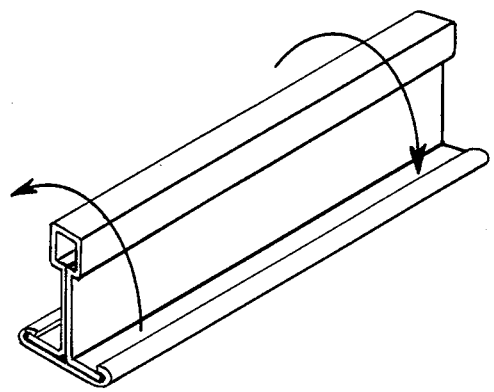
Fig. 3
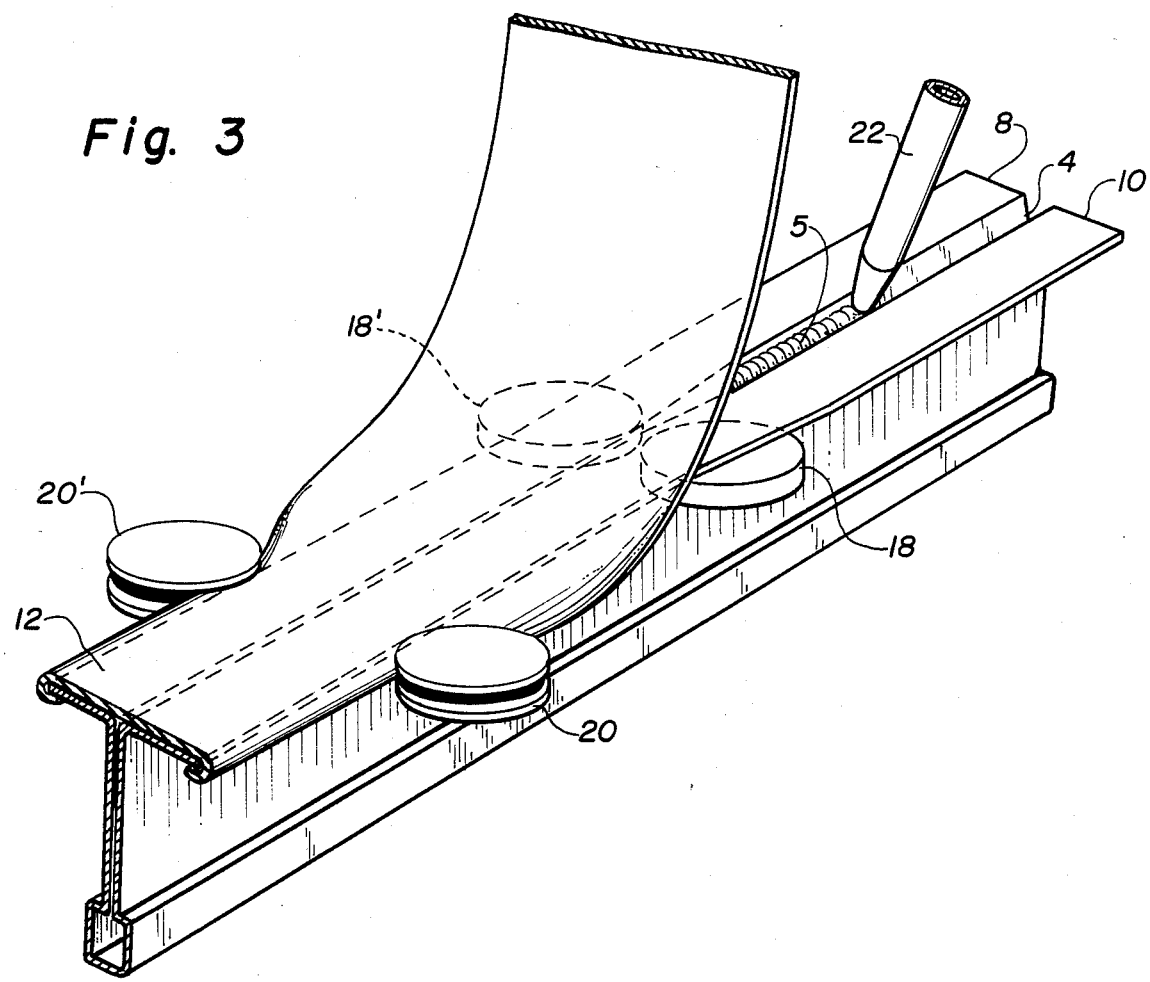

METHOD OF REINFORCING A CEILING RUNNER

BACKGROUND OF THE INVENTION

1. Field of the Invention

The invention is directed to a method of fabricating a specific runner and, more particularly, to a method of reinforcing the ceiling runner by using an adhesive in conjunction with a mechanical bonding.

2. Description of the Prior Art

U.S. Pat. No. 4,206,578 is directed to a typical double web capped T bar grid.

U.S. Pat. No. 3,845,544 is directed to a method of forming sheet metal structures wherein the sheet metal components are glued together.

U.S. Pat. No. 3,725,169 is directed to a sheet metal structure where two metallic sheets are bonded together.

U.S. Pat. No. 3,029,914 is directed to a sheet metal structure where two sheet metal structures have been adhesively joined together and the sheet metal structures have also been fabricated to a specific shape.

SUMMARY OF THE INVENTION

The invention is directed to the method of making a ceiling runner. The first step involves the forming of an inverted T-shaped runner with a vertical web and two horizontal flanges at the base of the web with one horizontal flange being disposed perpendicularly on each side of the vertical web.

A strip of material is applied to the underside of both horizontal flanges with the sides of the strip of material extending beyond the edges of the horizontal flanges. Each side of the strip of material is wrapped around and slightly over each edge of the horizontal flange whereby the bottom and edges of the horizontal flanges are encased in the strip of material. The improvement herein is in the application of an adhesive material to the T-shaped runner prior to the application of the strip of material. This adhesive is immediately bonded to the T-shaped runner and rigidifies the inverted T-shaped runner.

BRIEF DESCRIPTION OF THE DRAWINGS

FIG. 1 is an end view of an inverted T-shaped runner with a capped horizontal flange, FIG. 2 is a perspective view of the inverted T-shaped runner and FIG. 3 is a view of the process for applying the adhesive.

DESCRIPTION OF THE PREFERRED EMBODIMENT

The purpose of the invention herein is to provide a method of adding strength to a T-bar grid fabricated with a double web and cap system. More particularly, one desires to add strength in pounds per foot deflection and in torque strength by twisting. The addition of strength is achieved by coating the inside of the vertical web, or a portion of the cap strip and the bottom sides of the flanged areas which attach to the cap strip, with a "hot melt" adhesive. The precoated metal is assembled in the rolling mill by existing techniques. Cooling sets the adhesive and results in the grid gaining a "unitized" structure. A number of advantages result from the utilization of the process herein. It is possible now to reduce the number of bends incorporated in the cross-sectional configuration. Lighter gauge metals may now be utilized to give the same properties as current grid structures not containing the hot melt adhesive. There is added value to the grid in that the customer can feel by a comparison the improved strength of the grid herein as compared to other grid structures not containing the hot melt adhesive.

A grid member is conventionally formed by taking a piece of sheet metal of 0.010" to 0.015" thickness steel and through the use of a conventional metal forming technique convert it into an inverted T-shaped runner, such as runner 2 of FIG. 1. The single piece of metal is basically bent in its center to form the vertical web 4. The runner may be provided with an enlarged top 6 or it could be simply formed by bending the piece of sheet metal at its midpoint with a 180° fold. The ends of the piece of sheet metal are bent out at a 90° angle from each side of the vertical web 4 to form the two horizontal flanges 8 and 10. These flanges are disposed perpendicularly to the vertical web at the base of the vertical web as shown in FIG. 1.

Conventionally, a cap strip of material 12 is applied to the horizontal flanges of the grid for both a decorative effect and also to cover up the gap that exists between the two webs of material forming the vertical web 4 of the runner. The cap strip 12 would be of 0.010" thickness steel and would be slightly wider than the width of the horizontal flanges 8 and 10 as measured from the edge of one horizontal flange to the edge of the opposite horizontal flange. Through a conventional metal forming technique the sides 14 of the strip of material 12 are folded around the edge of the horizontal flange and are placed slightly above the top edge of the horizontal flange to form the structure shown in FIG. 1. Consequently the bottom and edges of the horizontal flange are encased in a strip of material.

The above structure is conventional in the art as shown in U.S. Pat. No. 4,206,578. The invention herein lies in the application of a hot melt adhesive to either the underside of flanges 8 and 10 and/or the upper surface of the strip of material 12 or the area 5 of the vertical web prior to the time that these elements are assembled. A particularly good hot melt adhesive that could be utilized is the ethylene vinyl acetate hot melt adhesive of National Starch and Chemical Corp. sold under the trade name Instant Lok 34-2878. After the adhesive coating is applied, the flanges 8 and 10 and the piece of material 12 are assembled in a conventional manner as above described. It is believed that the invention herein is not restricted to just the use of a hot melt adhesive, but any adhesive or even solder could be utilized which would tend to bond together the elements of the inverted T-shaped runner. If a hot melt adhesive is used, the adhesive would be heated to approximately 350° F. which will soften the adhesive and upon its cooling the adhesive will be bonded to the metal surfaces and consequently bond together the metal surfaces.

As a result of the use of the adhesive, the torque strength of a conventional runner is noticeably improved. If one would take the runner structure of FIG. 2, which is a conventional capped runner structure, and grasp it at both ends and twist it in the direction shown by the arrows there would be an application of torque to the runner and this would provide an indication of the torque strength of the runner. The presence or absence of the hot melt adhesive makes a very noticeable change in the torque strength and there is a substantial increase in the torque strength of the inverted T-shaped runner using an adhesive at the interface between the bottom of horizontal flanges 8 and 10 and the top of the piece of material 12, or the area 5 between the two elements of the vertical web. The placement of the adhesive can also affect the load strength which is the load the runner will support on its horizontal flanges.

As originally applied, the adhesive was placed as shown in FIG. 1. Here the adhesive 16 is between the two parts of the vertical web at the lower region of the vertical web. Other application techniques placed the adhesive just between the horizontal flanges and cap strip, or just on the ends of the horizontal flanges and not on the rest of the horizontal flanges (the center region of the flanges). Placing the adhesive only between the vertical web members gave improved torque strength, but no improved vertical load strength while placing the adhesive only at the ends of the horizontal flanges increased both torque and vertical load strengths.

FIG. 3 shows the method of applying the adhesive to the area 5 between the two parts of the vertical web 4. After the strip of metal forming the inverted T-bar is initially bent to form the flanges 8 and 10 and the two parts of the vertical web 4, the two parts of the vertical web are forced together by rolls 18,18′. The cap strip 12 is placed over the horizontal flanges 8 and 10 and rolls 20,20′ roll the edges of the cap strip 12 around the edges of the horizontal flanges as shown in FIG. 1. This is the conventional way of forming a capped inverted T-bar runner.

The runner is moving at a rate of 240 feet per minute during its fabrication. A nozzle 22 applies hot melt adhesive to both parts of the vertical web in the area 5 which is the lower region of the vertical web. The nozzle is positioned about 6 inches from the point where the rolls 18,18′ place the two parts of the vertical web in contact with each other. At the point where the nozzle is positioned, the two parts of the vertical web are still spaced apart a sufficient distance that the nozzle 22 can apply hot melt adhesive to the area 5. Within a fraction of a second (about ⅛ second) after the adhesive is applied, the two parts of the vertical web are pushed together and held together by the cap strip 12. Therefore, before any noticeable cooling of the adhesive can occur, the adhesive is placed under pressure and will wet and adhere to the metal surfaces of the two parts of the vertical web. Any delay in adhering the two parts together will permit the cool metal to chill the adhesive and then the adhesive will not wet to and properly adhere to the metal.

What is claimed is:

1. The method of making a ceiling runner comprising the steps of:
    (a) forming an inverted T-shaped runner from one piece of metal with the metal folded in half to form two parts of a vertical web and two horizontal flanges at the base of the web with one horizontal flange disposed perpendicularly on each side of the vertical web,
    (b) applying a strip of metal to the underside of both horizontal flanges with the sides of the strip of metal extending beyond the edges of the horizontal flanges,
    (c) wrapping each side of the strip of metal around and slightly over each edge of the horizontal flanges whereby the bottom and edges of the horizontal flanges are encased in the strip of metal, and
    (d) the improvement comprising the step of:
        (1) applying an adhesive material to the interface of the two parts of the vertical web just prior to the time the two parts are placed in contact and held in position by the strip of metal wrapped around the edges of the horizontal flanges.

2. The method of making a ceiling runner as set forth in claim 1 wherein there is less than a second in time between the application of the adhesive and the contacting of the two parts of the vertical web whereby the adhesive will not chill noticeably, and the adhesive will properly wet and adhere to the metal surfaces of the two parts of the vertical web.

* * * * *